3,440,277
FLUOROAROMATIC COMPOUNDS
Dewey G. Holland, Allentown, Pa., and Christ Tamborski, Dayton, Ohio, assignors to the United States of America as represented by the Secretary of the Air Force
No Drawing. Filed Dec. 13, 1965, Ser. No. 514,766
Int. Cl. C07c 63/00
U.S. Cl. 260—515                                4 Claims

ABSTRACT OF THE DISCLOSURE 2,2',5,5',6,6'-hexafluorobiphenyls are substituted in the 3,3',4,4'-positions with nonfluoro radicals such as hydrazino, hydrogen, bromine, lithium, carboxyl (or esters thereof), hydroxyl, imido, and the like. A method of making a number for the compounds in sequence is described. The compounds have good heat stability, good stability in the presence of oxygen, and are intermediates in the preparation of polymeric resins and oils.

---

The invention described herein may be manufactured and used by or for the United States Government for governmental purposes without the payment to us of any royalty thereon.

This invention deals with derivatives of decafluorobiphenyl wherein certain of the fluorine atoms are replaced with other substituents. The invention deals also with methods of making these compounds. Of particular interests are 2,2',5,5',6,6'-hexafluorobiphenyls substituted in the 3,3',4,4'-positions with selected non-fluoro radicals such as carboxyl radicals, for example. Radicals in structural formulae commonly are indicated by the symbol R.

Research of the past several years has indicated that valuable chemical substances might be made by the successful substitution of a plurality of fluorine atoms for hydrogen atoms in organic compounds. Among the organic compounds which can be considered for such substitution are the aromatic hydrocarbons; one of which, biphenyl (I); is of particular interest here.

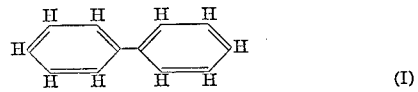

It is now known to the art that biphenyl ($C_{12}H_{10}$) can be readily converted to decafluorobiphenyl (II) with the formula $C_{12}F_{10}$.

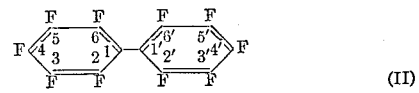

The above structure can also be drawn as:

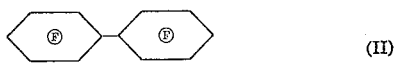

to indicate that, unless shown otherwise, all ring positions are occupied by fluorine atoms. This structural scheme will be used in this specification.

One of the principal motivating factors in attempting such extensive substitution of fluorine atoms for hydrogen atoms is the expectation of gaining a product of greater stability, particularly heat stability and stability in the presence of oxygen. This advantage is particularly worthwhile where the product is a polymeric resin or oil, a monomer of such polymer, or a precursor compound which permits of the facile preparation of such polymers or other desirable compounds.

OBJECTS

It is therefore an object of this invention to provide to the art new fluoro-substituted aromatic compounds and methods of their preparation.

It is a further object of this invention to prepare compounds from decafluorobiphenyl (II) wherein selected fluorine atoms are replaced with other constituents and, in particular, to prepare compounds suitable as intermediates in the preparation of polymeric substances.

It is a further object of this invention to prepare 2,2', 5,5',6,6'-hexafluorobiphenyls substituted in the 3,3',4,4'-positions with selected substituents other than fluorine atoms.

It is a specific object of the invention to provide to the art hexafluorobiphenyl-3,3',4,4'-tetracarboxylic acid (IX), its anhydride (X), and methods for their preparation.

It is also a specific object of the invention to provide a method which will make sequentially a number of valuable derivatives of decafluorobiphenyl including, first 4,4'-dihydrozinooctafluorobiphenyl (III) and, utilimately hexafluorobiphenyl-3,3',4,4'-tetracarboxylic acid (IX) or its anhydride (X).

Other objects and features of the invention will become apparent with a reading of this specification and the appended claims.

We have now found that the foregoing and related objects can be attained by the sequential replacement of the 4-positioned fluorine atom, the 4'-fluorine atoms, and the 3,3'-fluorine atoms of decafluorobiphenyl (II) with other substituents. Such replacement may be carried out, for example, by replacing the 4,4'-fluorine atoms of decafluorobiphenyl (II) with hydrazine groups, the latter than being replaced with various selected substituents.

We have also found that the said specific objects can be attained in methods wherein decafluorobiphenyl (II) is treated in a manner to effect sequentially the replacement of the 4,4'-fluorine atoms with hydrazino groups to form 4,4'-dihydrazinooctafluorobiphenyl (III); the replacement of the 4,4'-hydrazino groups and the 3,3'-fluorine atoms with hydrogen atoms to form 2,2',3,3',6,6'-hexafluorobiphenyl (IV); the replacement of the 3,3',4,4'-hydrogen atoms with bromine atoms to form 3,3',4,4'-tetrabromohexafluorobiphenyl (V); the replacement of the 4,4'-bromine atoms with lithium atoms to form 4,4'-dilithio-3,3'-dibromohexafluorobiphenyl (VI); the replacement of the 4,4'-lithium atoms with carboxyl radicals to form 3,3'-dibromohexafluorobiphenyl - 4,4' - dicarboxylic acid (VII); the replacement of the 3,3'-bromine atoms with lithium atoms to form the lithium salt of 3,3'-dilithiohexafluorobiphenyl - 4,4' - dicarboxylic acid (VIII); the replacement of the 3,3'-lithium atoms with carboxyl radicals to form hexafluorobiphenyl-3,3',4,4'-tetracarboxylic acid (IX); and the dehydration of the tetra-acid to form its anhydride (X).

The anhydride (X) of hexafluorobiphenyl-3,3',4,4'-tetracarboxylic shows excellent promise for the formation of heat resistant polymers, and therefore it is a feature of the invention to provide intermediates suitable for the preparation of such a polymer, such intermediates forming the group of fluorobiphenyls consisting of 4,4'-dihydrazinooctafluorobiphenyl (III);
2,2',3,3',6,6'-hexafluorobiphenyl (IV);
3,3',4,4'-tetrabromohexafluorobiphenyl (V);
4,4'-dilithio-3,3'-dibromohexafluorobiphenyl (VI);
3,3'-dibromohexafluorobiphenyl-4,4'-dicarboxylic acid (VII);
lithium salt of 3,3'-dilithiohexafluorobiphenyl-4,4'-dicarboxylic acid (VII);
hexafluorobiphenyl-3,3',4,4'-tetracarboxylic acid (IX); and
hexafluorobiphenyl-3,3',4,4'-tetracarboxylic acid anhydride (X).

It is also a feature of the invention to provide methods wherein each said compound of said class is made from a compound listed before it and particularly from the compound listed immediately before it, the first named (III) of said class being made from the known decafluorobiphenyl (II). Structural formulas for some of the compounds of the invention are:

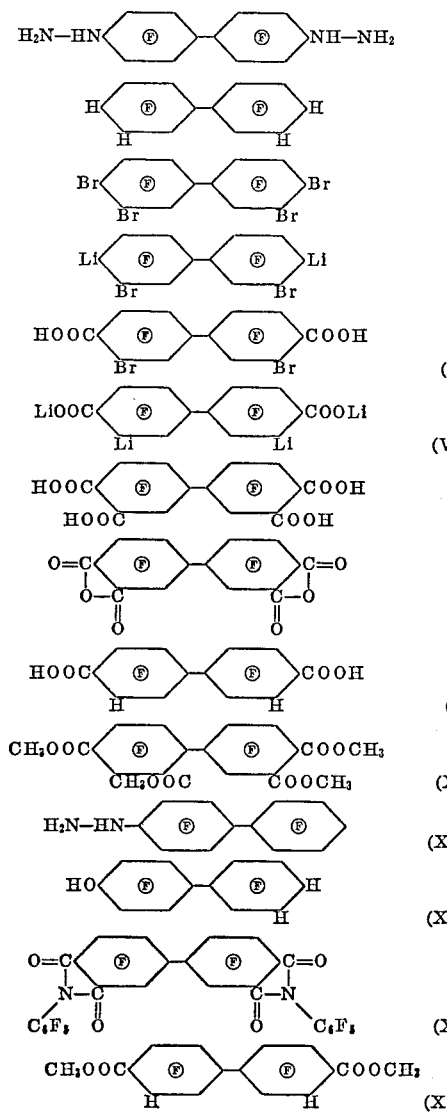

Methods of making the foregoing compounds are shown in the following examples.

Example 1

Preparation of 4,4' - dihydrazinooctafluorobiphenyl (III).—Decafluorobiphenyl (II) (100.2 g., 0.3 mole) and 95 (plus) percent anhydrous hydrazine (40.3 g., 1.2 moles) were stirred and heated at reflux temperature in 450 ml. of absolute ethanol for 21 hr. The mixture was then distilled, in vacuo, to half of its original volume and was decanted into 700 ml. of water. A precipitate formed and was filtered off. The precipitate was added to, stirred, and heated in 800 ml. of 1:1 solution of 95% ethanol: benzene. The resulting mixture was filtered hot. After cooling the filtrate, 20.8 g. of a white crystalline product with a melting point of 208–211° C. separated out and was collected. The solid which did not dissolve in the hot ethanol:benzene had a melting point of 209–211° C. and weighed 67.0 g. The combined yield of 4,4'-dihydrazinooctafluorobiphenyl (III) was 82.8 g. (77%). Upon recrystallization, the product had a melting point of 210.5–212.5° C.

Example 2

Preparation of 2,2',3,3',6,6'-hexafluorobiphenyl (VI).—A slurry of 4,4'-dihydrazinooctafluorobiphenyl (III) (44.8 g., 0.125 mole) was stirred and heated in 400 ml. of absolute ethanol in which 5.75 g. (0.25 mole) of sodium had been thoroughly reacted. Nitrogen evolution, measured on a wet test meter, became vigorous at 75°. After 0.5 hr. at this temperature, the theoretical amount (5,600 cc.) of nitrogen had been collected. The cooled solution was decanted into 1.5 liters of water. The pH was adjusted to approximately 7 with concentrated hydrochloric acid. The cooled suspension was filtered and the solid product which filtered out was dried in a desiccator over sodium hydroxide. The dried solid was sublimed at 53° C./0.1 mm. Subsequent recrystallization from 85% ethanol (2 ml./g.), yielded 26.5 g. (81%) of white crystalline 2,2',3,3',6,6'-hexafluorobiphenyl (IV) with a melting point of 52.8–55.3° C. Additional recrystallization yielded a product which melted at 53.5–55° C.

The theoretical analysis for hexafluorobiphenyl is C, 54.98%; H, 1.54%; and F, 43.5%. C, 54.9%; H, 1.76%; and F, 43.4% were found.

The $F^{19}$ nuclear magnetic resonance spectrum in acetone exhibited multiplets at 39.6, 58.2 and 66.6 p.p.m.

A vapor phase chromatogram of the unrecrystallized product, using an F. & M. Model 500 Programmed Vapor Phase Chromatograph, showed the product to be a mixture of 2,2',3,3',6,6'-hexafluorobiphenyl (92.4%), 2,2',3,3',5,5',6,6'-octafluorobiphenyl (0.6%) and what was believed to be 2,2',3,3',5,5',6,6'-heptafluorobiphenyl (6.9%).

Example 3

Preparation of 3,3',4,4'-tetrabromohexafluorobiphenyl (V).—2,2',3,3',6,6'-hexafluorobiphenyl (IV) (21.0 g., 0.08 mole) was slowly added to a well stirred mixture of 55.9 g. (0.35 mole) of bromine, 3.5 g. of anhydrous aluminum bromide and 80 ml. of 65% oleum at ice bath temperature. The resulting paste liquefied as it was heated to 60–65° C. at which temperature it was refluxed. Regular gas evolution began at 40° C. The mixture was stirred at the reflux temperature for 3 hrs. The solution was cooled and was then poured over 500 g. of ice. A precipitate formed and was filtered out, the filtrate being discarded. The product was stirred and pulverized in 500 ml. of 10% sodium metabisulfite solution, until its bright orange color disappeared. The solid was collected and washed in 500 ml. of 5% sodium bicarbonate solution and, finally, in 500 ml. of water. The product was dried over $MgSO_4$ and was then dissolved in ether. The ether solution of the solid was passed through a 75 x 20 cm. column of neutral alumina. The colorless product passed rapidly through the column, before colored bands were elutriated. In this fashion, 38.4 g. (83%) of white crystalline 3,3',4,4'-tetrabromohexafluorobiphenyl (V) were obtained by distilling the ether solution, in vacuo. Recrystallization from petroleum ether (B.P. 90–120° C.) yielded an analytically pure product, M.P. 141.5–143° C.

The theoretical analysis for 3,3',4,4'-tetrabromohexafluorobiphenyl is C, 24.94%; Br, 55.3%; and F, 19.7%. C, 25.22%; Br, 54.8%; and F, 19.9% were found.

The F[19] N.M.R. spectrum in benzene exhibited three multiplets at 24.8, 50.7 and 57.0 p.p.m.

Example 4

Preparation of 3,3'-dibromohexafluorobiphenyl-4,4'-dicarboxylic acid (VII).—n-Butyllithium (58 ml. 0.09 mole, 1.54 N in n-hexane) was added to a stirred solution of 3,3',4,4'-tetrabromohexafluorobiphenyl (V) (11.5 g., 0.02 mole) in 100 ml. of dry THF (tetrahydrofuran) under nitrogen, the addition being made slowly so that the reaction temperature did not exceed −60° C. During the addition, the initially colorless solution became yellow-orange. When the addition was complete the resulting white slurry was stirred for one hour at −70° C. The product at this point was 4,4'-dilithio-3,3'-dibromohexafluorobiphenyl (VI) but it was not separated out. Rather, gaseous carbon dioxide was introduced into the reaction mixture at such a rate as to insure that the reaction temperature never exceeded −55° C. After carbonation at low temperature for 0.5 hr., the mixture was allowed to warm to room temperature as carbonation was continued. The mixture was then hydrolyzed with 200 ml. of 6 N HCl. The two phased mixture was extracted three times with 200 ml. portions of ether. The combined ether extracts were dried over $MgSO_4$ and stripped, in vacuo. White solid 3,3'-dibromohexafluorobiphenyl-4,4'-dicarboxylic acid (VII) was collected and washed with petroleum ether (B.P. 30–60° C.). The product was recrystallized from nitrobenzene, affording 7.4 g. (85%) of a white powder which melted at 310–313° C.

The theoretical analysis of 3,3'-dibromohexafluorobiphenyl-4,4'-dicarboxylic acid (VII) is C, 33.10%; H, 0.40%; Br, 31.5%; and F, 22.4%. C, 32.42%; H, 0.41%; Br, 32.7%; and F, 22.5% were found.

The F[19] N.M.R. spectrum in ethanol exhibited absorption at 27.8, 53.5 and 62.1 p.p.m.

Example 5

Preparation of hexafluorobiphenyl-3,3',4,4'-tetracarboxylic acid (IX).—Nine grams (0.018 mole) of 3,3'-dibromohexafluorobiphenyl-4,4'-dicarboxylic acid (VII) in 400 ml. of dry THF was treated with 50 ml. (0.079 mole) of 1.58 N n-butyllithium in n-hexane. A negative color test for unreacted butyllithium was obtained 2 hr. after the addition was completed. The reaction mixture was then carbonated, hydrolyzed and extracted with ether in the same manner as in Example 4. The lithium salt of 3,3'-dilithiohexafluorobiphenyl-4,4'-dicarboxylic acid (VIII) formed at this point but was not separated out prior to the carbonation step. The combined ether extracts were evaporated, in vacuo, affording a tacky tan solid. The product was triturated with petroleum ether (B.P. 60–90°) for 4 hrs. in a Soxhlet extractor. The product was dissolved in diethyl ether and passed through silica gel employing diethyl ether as the elutriant. Evaporation of the ether afforded 7.3 g. (93%) of pale tan hexafluorobiphenyl-3,3',4,4'-tetracarboxylic acid (IX) which melted at 226–228° C. The product contained no bromine.

A satisfactory analysis of the product was obtained and the F[19] N.M.R. spectrum in acetone exhibited absorption at 35.9, 49.8 and 64.7 p.p.m.

Example 6

Preparation of hexafluorobiphenyl-3,3'-4,4'-tetracarboxylic acid anhydride (X).—A portion of the hexafluorobiphenyl-3,3',4,4'-tetracarboxylic acid (IX) prepared as in Example 5 was refluxed in xylene. The anhydride (X) of the acid formed readily and the theoretical quantity of water evolved from the acid was collected as an ether-water azeotrope. The anhydride, which melts at 115–125° C., was collected as a white solid by concentration of the xylene solution. The anhydride is quite reactive with water and could be converted back to the tetra acid by a few minutes' reaction with humid air.

Example 7

Preparation of 2,2',3,3',6,6'-hexafluorobiphenyl-4,4'-dicarboxylic acid (XI).—n-Butyllithium (214 ml. of 1.54 N solution, 0.33 mole) was slowly added to a stirred solution of 39.3 g. (0.15 mole) of 2,2',3,3',6,6'-hexafluorobiphenyl (IV) in 600 ml. of dry tetrahydrofuran (THF), under nitrogen. The reaction temperature was held under −55° C. One hour after the addition was completed, a negative color test for unreacted butyllithium was obtained. Gaseous carbon dioxide was introduced into the solution while the reaction temperature was maintained below −55° C. Carbonation was continued for 1 hr. at this temperature and for an additional hour while the solution was allowed to warm to room temperature. The mixture was hydrolyzed with 800 ml. of 6 NHCl. The resulting mixture was extracted three times with 200 ml. portions of diethyl ether. The combined ether extracts were dried over $MgSO_4$, filtered and distilled in vacuo. The solids 2,2',3,3',6,6'-hexafluorobiphenyl-4,4'-dicarboxylic acid (XI) product was washed thoroughly with hexane and recrystallized from nitrobenzene affording 43.6 g. (83%) of the diacid which melted at 303–306° C. The theoretical analysis of this compound is C, 48.02%; H, 1.15%; and F, 32.6%. C, 48.07%; H, 1.12%; and F, 33.8% were found.

The F[19] N.M.R. spectrum in acetone exhibits three multiplets at 37,0, 53.3 and 60.4 p.p.m.

The ester, dimethyl 2,2',3,3',6,6'-hexafluorobiphenyl-4,4'-dicarboxylate (XVI), was obtained from the reaction between the diacid (XI) and diazomethane in diethyl ether. Recrystallization of the crude ester from petroleum ether (B.P. 90–120° C.) afforded white needles which melted at 112.5–114° C.

The theoretical analysis for the dimethylhexafluorobiphenyl - 4,4' - dicarboxylate (XVI) is C, 50.81%; H, 2.13%; and F, 30.1%. C, 50.76%; H, 2.41%; and F, 30.5% were found.

The F[19] N.M.R. spectrum in acetone exhibits three fluorine environments at 37.9, 54.5 and 62.2 p.p.m.

Example 8

Preparation of tetramethyl hexafluorobiphenyl-3,3',4,4'-tetracarboxylate (XII).—Five grams (0.0114 mole) of hexafluorobiphenyl - 3,3',4,4'-tetracarboxylic acid (IX) were dissolved in diethyl ether at 0° and were treated with excess diazomethane solution. The solution was evaporated in vacuo, affording an oil. The oil was dissolved in petroleum ether (B.P. 90–120° C.) containing a small amount of diethyl ether. Slow evaporation of the solution yielded a white precipitate. The precipitate, an ester, was collected and recrystallized from chloroform-petroleum ether (B.P. 60–90° C.) affording 4.0 g. (71%) of tetramethyl hexafluorobiphenyl - 3,3',4,4'-tetracarboxylate as white needles melting at 106.5–108° C.

The theoretical analysis of this compound is C, 48.59%; H, 2.45%; and F, 23.1%. C, 48.43%; H, 2.17%; and F, 23.4% were found.

The F[19] N.M.R. spectrum in acetone exhibits absorption at 35.6, 48.8 and 63.8 p.p.m.

Example 9

Preparation of 4,4'-bis (N,N'-pentafluorophenyltrifluorophthalimide) (XV).—Five grams (0.0114 mole) of hexafluorobiphenyl - 3,3',4,4' - tetracarboxylic acid (IV) were dissolved in 50 ml. of xylene. The solution was heated to reflux temperature. After 2.5 hrs., approximately 0.38 ml. (93%) of water had been collected in a Dean-Stark trap. Pentafluoroaniline (4.6 g., 0.025 mole) was added to the solution and the solution was heated to reflux temperature for 3 hrs. An additional 0.34 ml. (83%) of water was collected. A small amount of insoluble material was filtered off and the filtrate was decanted into 300 ml. of petroleum ether (B.P. 30–60° C.). The resulting precipitate was collected and recrystallized from benzene to afford 6.0 g. (72%) of white crystalline 4,4'-bis(N,N'- pentafluorophenyltrifluorophthalimide) (XV) which melted at 305.5°–308° C.

The theoretical analysis for this compound is C, 45.92%; F, 41.5%; and N, 3.82%. C, 46.06%; F, 41.6%; and N, 3.86% were found.

Example 10

Joint preparation of 4-hydrazinononafluorobiphenyl (XIII) and 4,4'-dihydrazinooctafluorobiphenyl (III).—Decafluorobiphenyl (II) (33.4 g., 0.1 mole) and 95 (plus) percent anhydrous hydrazine (6.7 g., 0.2 mole) were stirred and refluxed in 350 ml. of absolute ethanol for 23 hours. Half of the solvent was removed by distillation and the remaining solution was decanted into 400 ml. of water. The precipitate was removed by filtration and thoroughly washed with water. Recrystallization from hot benzene yielded, as the first precipitate, 6.5 g. (18%) of white crystalline 4,4'-dihydrazinooctafluorobiphenyl (III) which melted at 198.5–206.5° C. Three recrystallizations from benzene-ethanol gave an analytically pure sample which melted at 210.5°–212.5° C.

The theoretical analysis for the dihydrazine compound is C, 40.24%; H, 1.69%; F, 42.4%; and N, 15.64%. C, 41.02%; H, 1.81%; F, 42.6%; and N, 15.80% were found The $F^{19}$ nuclear magnetic resonance spectrum in acetone exhibited multiplets at 63.7 and 77.7 p.p.m.

On cooling the hot benzene filtrate, 24.9 g. (72%) of tan, crystalline 4-hydrazinononafluorobiphenyl (XIII) which melted at 130–132° C. precipitated out. One recrystallization from absolute ethanol gave an analytically pure sample which melted at 132°–133.5° C.

The theoretical analysis for the monohydrazine compound (XIII) is C, 41.63%; H, 0.87%; F, 49.4%; and N, 8.09%; C, 41.81%; H, 0.98%; F, 49.2; and N, 8.13% were found.

The $F^{19}$ nuclear magnetic resonance spectrum in acetone exhibited absorption at 61.8, 64.8, 76.2, 79.0, and 85.6 p.p.m. Two unidentified, weak fluorine environments (80.7 and 82.3 p.p.m.) appear similar to the absorption at 79.0 p.p.m. which is assigned to the fluorine ortho to the hydrazino function. These may arise due to formation of the hydrazone in acetone solution.

Example 11

Preparation of 4-hydroxy-2,2',3,3',5,6,6'-heptafluorobiphenyl (XIV).—A slurry of 6.3 g. (0.0182 mole) of the 4-hydrazinononafluorobiphenyl (XIII) prepared as in Example 10, in 300 ml. of 3 N sodium hydroxide was stirred and heated to reflux. A suspension was observed throughout the reaction course. Thirteen hours from the time heating was initiated, 285 cc. (70%) of nitrogen was observed on a wet test meter. After cooling, the reaction mixture was filtered. Both the white solid obtained and the solid which had sublimed into the condenser were identified as starting material (1.9 g. 30% recovery). The aqueous filtrate was acidified with concentrated hydrochloric acid. The resulting solution was extracted for 12 hours ether in a liquid-liquid extractor. Evaporation of the ether extract afforded 2.2 g. (41%) of white, crystalline 4-hydroxy-2,2',3,3',5,6,6' - heptafluorobiphenyl (XIV) which melted at 101.5°–104.5° C. Two recrystallizations from 90–120° ligroine gave an analytically pure sample which melted at 111.5°–112.5° C. This compound yields a pink color with aqueous ferric chloride.

The theoretical analysis for this compounds is C, 48.67%; H, 1.02%; and F, 44.97. C, 48.81%; H, 1.24%; and F, 45.0% were found.

The $F^{19}$ nuclear magnetic resonance spectrum in acetone is consistent with the proposed structure. Four multiplets are observed in the ratio 1:1:3:2 (38.7, 56.6, 64.7, and 84.4 p.p.m. respectively).

In the foregoing examples, the $F^{19}$ nuclear magnetic resonance data was taken on a Varian V–4300–Z D.P. spectrometer at 40.0 mc./sec. All melting points below 250° C. have been corrected.

It will be apparent to those skilled in the art that the compounds prepared in accordance with the examples given can be used as intermediates in the preparation of a wide variety of other derivatives within the scope of the invention. For example, the carboxyl radicals can be reacted with other alkylating agents to form other carboxylates comparable to dimethyl 2,2',3,3',6,6'-hexafluorobiphenyl-4,4' carboxylate (XVI) and tetramethyl hexafluoro-3,3',4,4'-dicarboxylate (XII). Similarly, esters can be formed via the carboxyl radicals by reaction with suitable alcohols. Further by way of example, hydroxyl groups can be acetylated. Thus, the use of specific examples is not intended to limit the invention. Rather, other compounds and methods will fall within the scope and spirit of the invention which is defined in the appended claims.

We claim:

1. A 3,3',4,4' substituted fluorinated biphenyl of the structure

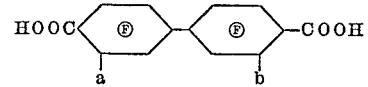

wherein *a* and *b* are radicals selected from the group consisting of carboxyl, bromine and hydrogen.

2. 3,3'-dibromohexafluorobiphenyl - 4,4' - dicarboxylic acid.

3. 2,2',3,3',6,6' - hexafluorobiphenyl-4,4'-dicarboxylic acid.

4. Hexafluorobiphenyl - 3,3',4,4'-tetracarboxylic acid.

References Cited

Holland et al.: Proceedings of American Chemical Society, 148th meeting, p. 28K (September 1964).

LORRAINE A. WEINBERGER, *Primary Examiner.*

M. G. BERGER, *Assistant Examiner.*

U.S. Cl. X.R.

260—346.3, 326, 620, 475, 649, 569